United States Patent [19]

Antonson

[11] Patent Number: 4,504,351
[45] Date of Patent: Mar. 12, 1985

[54] DECORATIVE TAPE DISPENSING AND APPLYING APPARATUS

[75] Inventor: David L. Antonson, Oakdale, Minn.

[73] Assignee: Minnesota Mining and Manufacturing Company, St. Paul, Minn.

[21] Appl. No.: 541,456

[22] Filed: Oct. 13, 1983

[51] Int. Cl.³ .............................................. B32B 35/00
[52] U.S. Cl. ..................................... 156/391; 156/523; 156/577
[58] Field of Search ............... 156/391, 523, 526, 527, 156/577

[56] References Cited

U.S. PATENT DOCUMENTS

| 2,057,061 | 10/1936 | Eggerss | 156/391 |
| 2,591,136 | 4/1952 | Cleary et al. | 156/391 |
| 2,868,402 | 1/1959 | Perry | 156/523 |
| 3,150,027 | 9/1964 | Moyer | 156/523 |
| 4,174,246 | 11/1979 | Ralston | 156/391 |

Primary Examiner—Michael Wityshyn
Attorney, Agent, or Firm—Donald M. Sell; James A. Smith; John C. Barnes

[57] ABSTRACT

A dispenser for a decorative tape to apply the same in a circular pattern and a fixture connected to the dispenser to guide the same along a circular path. The fixture comprising a rod pivotally connected to the dispenser on an axis perpendicular to the tape applicating roller and having a cross arm adjustable to the rod with guide rollers at each end thereof to define the circular pattern.

5 Claims, 6 Drawing Figures

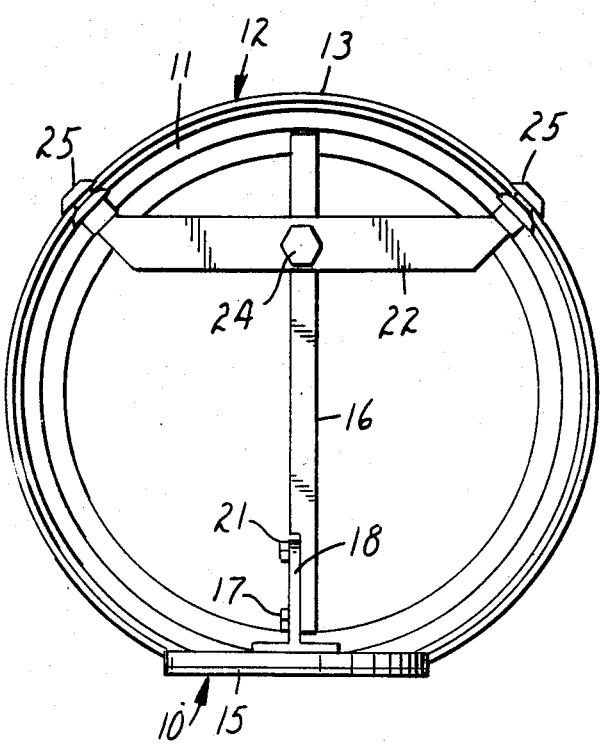
Fig. 2
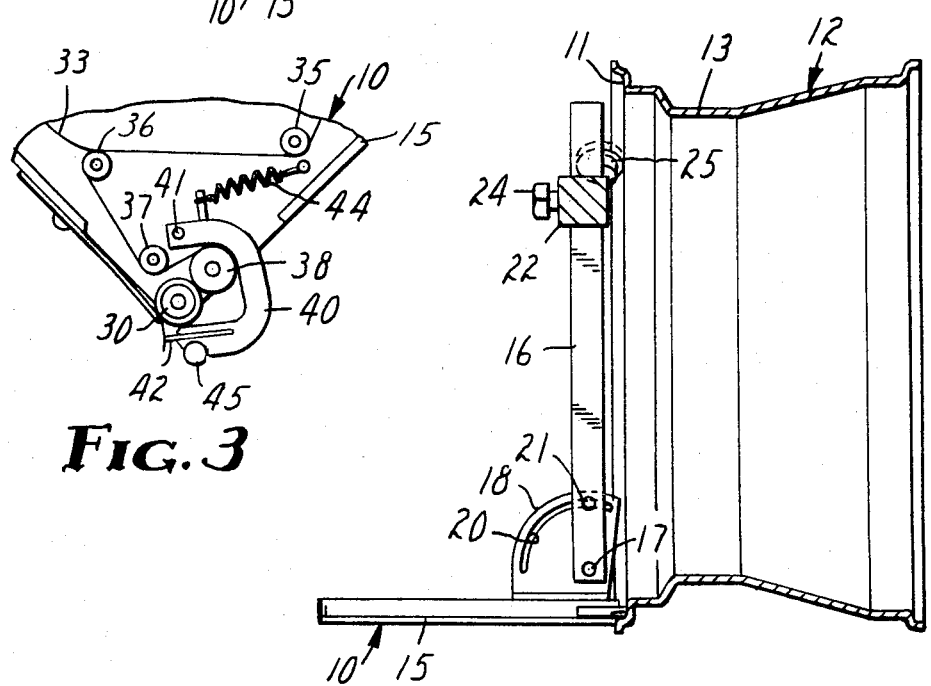
Fig. 3
Fig. 1

DECORATIVE TAPE DISPENSING AND APPLYING APPARATUS

BACKGROUND OF THE INVENTION

1. Field of the Invention

This invention relates to a device for dispensing and applying a strip of decorative material in a circular pattern.

2. Description of the Prior Art

Dispensers are known for applying strips of tape along a surface to be decorated or to apply tape to mask a surface during painting of an adjacent surface. Dispensers for masking or for applying strips of tape have utilized a guide member which is positioned to one side or forwardly of the tape applicating roller. These dispensers however have not been satisfactory for applying a narrow strip of a pressure-sensitive decorative tape to form a circle on a planar surface or slightly conical circular surface.

SUMMARY OF THE INVENTION

The present invention provides a dispenser for use in applying a strip of decorative tape onto a surface in a circular configuration. The dispenser of the present invention comprises a dispenser having a frame with a mandrel for rotatably supporting a roll of tape, guide means for directing the tape from the roll to an applicating roller, cutting means for cutting the tape adjacent the applicating roller, an arm pivotally connected to the frame of the dispenser and pivotal about an axis which is generally perpendicular to the axis of the mandrel supporting a strip of tape. Means are provided for adjusting the position of arm with respect to the dispenser to move the same between a position generally parallel to the axis of the mandrel and a position generally perpendicular to the axis of the mandrel. Adjustably supported along the arm is a cross arm which is provided with a pair of guide rollers to provide two guide points at circumferentially spaced positions with respect to the applicating roller to define the circular path of the applicating roller during application of the strip of tape. The guide rollers are rotatably supported on axes which are generally perpendicular to each other at opposite ends of the cross arm which is adjustably mounted with respect to the support arm to define the diameter of the circle to be formed by the tape.

BRIEF DESCRIPTION OF THE DRAWING

The present invention will be further defined hereinafter with reference to the accompanying drawing wherein:

FIG. 1 is a vertical sectional view of a wheel of an automobile with the dispenser of the present invention positioned thereon for applying a strip of tape to a circular generally flat surface on the wheel;

FIG. 2 is a right side view of the wheel of FIG. 1 showing the dispenser of the present invention positioned thereon;

FIG. 3 is a detailed view of the applicating roller and cutter of the dispenser;

DESCRIPTION OF THE PREFERRED EMBODIMENTS

Figure 4:
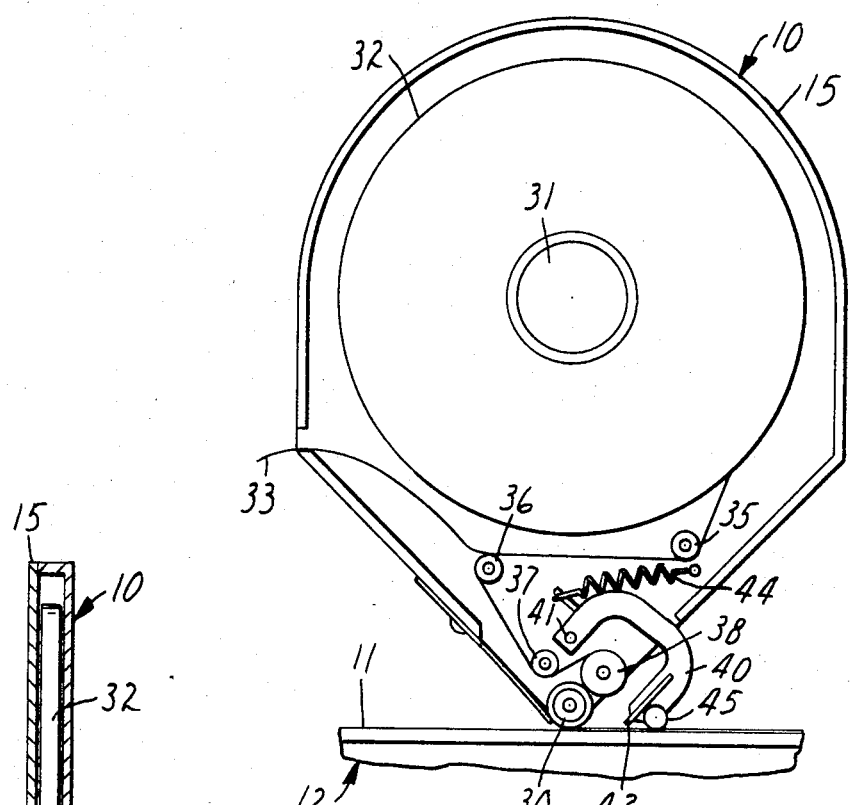
FIG. 4 is a view of the tape dispenser with one cover removed to show the interior portions of the dispenser.
Figure 5:
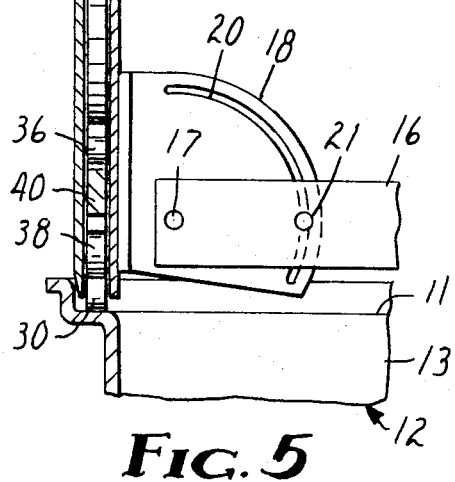
FIG. 5 is a detail view of the dispenser and the pivotal arm for positioning the dispenser on the surface to be striped.
Figure 6:
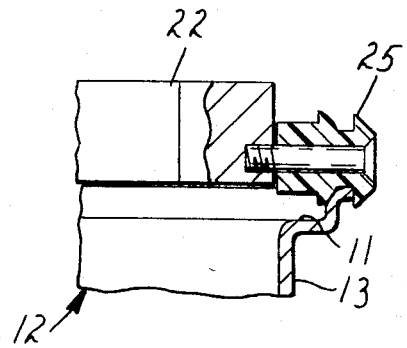
FIG. 6 is a detail view of the guide wheel on the cross arm.

The present invention provides a tape dispenser and fixture for applying a narrow, i.e. ⅛ inch (0.03 mm) to ½ inch (0.13 mm) wide, strip of tape and preferrably of the decorative film such as that sold under the tradename "SCOTCHCAL" colored vinyl film tapes having a pressure-sensitive adhesive and available from Minnesota Mining and Manufacturing Company (3M) of St. Paul, Minn. U.S.A. The dispenser permits the application of this decorative film on circular surfaces which are flat or generally concial such as the application of a stripe of decorative film on an automobile wheel or other area where a narrow strip of tape is desirable on a circular surface. The dispenser incorporates a unique film tracking system and tape cut-off system. The cutting system severs the tape in a position that facilitates starting a new application without handling the tape. The cut-off system provides for the cutting of the tape automatically. The cutting system works to cut the tape upon withdrawing the tool from the application surface while continuing the forward motion of the dispenser.

The dispenser 10 and fixture is illustrated for applying the narrow decorative film strip uniformly about a circular surface such as the rim 11 of the wheel, generally designated 12, having a felly 13 for supporting the tire. The dispenser 10 comprises a frame 15. Means are provided for adjusting the position of the frame with respect to the tape receptor surface. The frame 15 is pivotally mounted to an arm 16 of the fixture for movement with respect thereto about an axis defined by a pin 17. The pin 17 extends through one end of the arm 16 and through a hole in a gusset plate 18 fixed to the frame 15 of the dispenser 10. The gusset plate 18 is also provided with an arcuate slot 20 receiving a set screw 21 extending from the arm 16. The set screw 21 permits the arm 16 to be positioned with respect to the frame 15 from a position which is generally parallel to the frame 15 and a position which is at an angle to the frame 15.

The fixture further includes a cross arm 22 which is slidably mounted on the arm 16 and is positionable along the length of the arm 16 by a set screw 24. The cross arm 22 has a pair of guide rollers 25 rotatably supported at each end to stabilize the cross arm at two circumferentially spaced points from the dispenser 10. The rollers 25 are formed with bevelled surfaces and are each mounted on an axis which is angularly positioned with respect to the longitudinal axis of the cross arm 22. The axis of each of the guide rollers is generally perpendicular to each other. The rollers 25 thus rotate with respect to the guiding surface or the edge of the felly adjacent the surface 11 to permit an applicating roller 30 of the dispenser 10 to position the strip of decorative film about the rim 11. The axis of the applicating roller is generally perpendicular to the axis of pin 17.

The dispenser 10 is adapted for use with a linerless pressure-sensitive adhesive coated decorative film or with the conventional decorative film utilizing a liner over the adhesive.

The dispenser comprises a support mandrel 31 for supporting a roll of tape 32 which may be formed with a removable liner 33. The tape 32 is drawn from the periphery of the roll over a first tape guide such as an idler roller 35 and then to and around a second guide roller 36 where the liner is stripped from the adhesive.

The liner 33 is directed through an opening in the frame 10 away from the applicating roller 30. The tape goes from guide roller 35 over a third guide roller 37 to a knurled roller 38 which directs the tape onto the applicating roller 30. The roller 30 has a resilient coating to aid in pressing the tape against the surface, which may have some irregularlarity.

The cutting means on the dispenser 10 comprises a U-shaped knife support 40 which is pivotally mounted about a pin 41 at one end and the opposite end projects outside of the frame 15 and supports the cutting knife 42. The support 40 is biased by a spring 44 toward the applicating roller 30. The support 40 urges the tape into contact with the knurled roller 38 to brake the tape and to aid in tensioning the tape during the cutting motion. FIG. 4 illustrates the normal position of the knife support 40 during application and a roller 45 rolls on the tape to buff the tape with the aid of the bias spring 44 and lifts the support 40 away from roller 38. When the application of the strip is completed the operator can raise the dispenser from the applicating surface and continue the movement of the dispenser. The support 40 can move the knife 42 toward the position shown in FIG. 3 where it will cut through the tape closely adjacent the surface of the applicating roller 30. When the dispenser is raised the tape is tensioned between the application surface and the applicating roller 30 and easily cut by the knife to make a good butt joint at the joining ends of the tape strip completing the circular pattern.

The adjustable set screw 21 permits the dispenser 10 to be positioned perpendicular to the surface of the rim 11 upon which the strip is to be applied and the adjustment of the cross arm 22 with respect to the support arm 16 permits the exact positioning of the dispensing applicating roller 30 to maintain its path around the rim 11 by rotation of the dispenser and arm with respect to the axis of the wheel. The guide rollers 25 are formed to guide the cross arm around the outer edge of the felly of the wheel 12 or may engage an inner edge of the wheel 12, depending on the position of the surface 11 to which the strip is to be applied. The device can suitably be used to apply a strip to wheel covers as well as to the rim of the wheel.

Certain changes may be made in the construction of the dispenser of the present invention, but, all such modifications are contemplated as come within the scope of the appended claims.

I claim:

1. A dispenser for applying a narrow strip of decorative film in a circular pattern on a surface within the periphery of a circular body comprising a dispensing device having a frame for supporting a roll of tape and an applicating roller on one edge of the frame, a fixture is pivotally connected to said frame and extends therefrom for positioning the dispensing device on the surface to be striped, said fixture comprises an arm pivotally connected to the frame for movement about an axis generally perpendicular to the axis of the applicating roller and a cross arm adjustably attached to said arm intermediate the ends of said cross arm, said cross arm having guide means at each end for engaging a said circular body for guiding the path of said applicating roller to define a circular path for said applicating roller.

2. A dispenser according to claim 1 wherein said guide means comprise a pair of rollers mounted on axes generally perpendicular to each other.

3. A dispenser according to claim 1 wherein said dispenser comprises a feed roller for guiding said tape to said applicating roller to position the tape on the applicating roller.

4. A dispenser according to claim 1 wherein said dispenser comprises a cutting blade for severing the tape adjacent said applicating roller, said cutting blade being mounted on an arm pivoted to said frame to afford movement of the blade toward and away from said applicating roller.

5. A dispenser according to claim 4 wherein a spring biases said blade toward said applicating roller to sever the tape extending between said applicating roller and a said surface.

* * * * *